United States Patent [19]
Blouch

[11] 3,829,616
[45] Aug. 13, 1974

[54] RINGER BLOCKING ATTACHMENT FOR TELEPHONES

[75] Inventor: Roger D. Blouch, Willow Grove, Pa.

[73] Assignee: International Mobile Machines Corporation, Philadelphia, Pa.

[22] Filed: May 14, 1973

[21] Appl. No.: 359,966

[52] U.S. Cl. .......... 179/2 A
[51] Int. Cl. .......... H04m 3/42
[58] Field of Search .......... 179/2 A, 5.5; 340/171 A, 340/171 PF

[56] References Cited

UNITED STATES PATENTS

| | | | |
|---|---|---|---|
| 3,049,592 | 8/1962 | Waldman | 179/2 A |
| 3,376,389 | 4/1968 | Fair | 179/2 A |
| 3,530,250 | 9/1970 | Schaum | 179/2 A |
| 3,551,597 | 12/1970 | Russell | 179/2 A |

*Primary Examiner*—David L. Stewart
*Attorney, Agent, or Firm*—Arthur A. Jacobs

[57] ABSTRACT

A system for selectively ringing or actuating a telephone bell or any other desirable signal, or for alternatively actuating any functional device such as an alarm system, a timer, a radio, a coffee pot, etc., whereby when a telephone number is called, an auxiliary system automatically cuts in to prevent ringing or other actuation of the telephone bell or other signal device until a predetermined additional number or series of numbers are dialed or touch-toned at which time the telephone bell or other signal device is actuated or, alternatively, the functional device is actuated.

5 Claims, 5 Drawing Figures

RINGER BLOCKING ATTACHMENT FOR TELEPHONES

This invention relates to an attachment for a telephone, and it particularly relates to an attachment in the form of an auxiliary electronic network to selectively permit ringing of the telephone bell when a number is called.

Persons often receive solicitation and other telephone calls which are annoying and time consuming. However, when the 'phone rings, there is never any indication who it might be that is calling and the person receiving the call must answer the 'phone to determine who the caller is.

In an attempt to avoid undesirable calls, many people have resorted to the use of unlisted numbers. However, even if the number is unlisted, it may still be discovered, one way or another by undesirable parties. It is, furthermore, an annoyance for a legitimate caller who might forget the number and wish to place a call. In addition, a person may wish to determine whether a party is located in a city or area, for a legitimate purpose, but, if the number is not listed, he may never be able to obtain this information and an important contact may be lost.

It is one object of the present invention to overcome the above disadvantages by providing an auxiliary attachment or system which conserves the privacy and freedom from undesirable telephone calls of a user while permitting him to receive desirable calls and while maintaining his listing in the telephone directory if he so wishes.

Another object of the present invention is to provide a system of the aforesaid type whereby specific identifying codes can be provided for specified individuals so that the party receiving the call can immediately identify the caller before picking up the receiver.

Another object of the present invention is to provide a system of the aforesaid type that permits the owner of the system to control specific physical functions by merely calling his number and actuating the system.

Other objects and many of the attendant advantages of this invention will be readily appreciated as the same becomes better understood by reference to the following description when read in conjunction with the accompanying drawings wherein.

Figure 1:
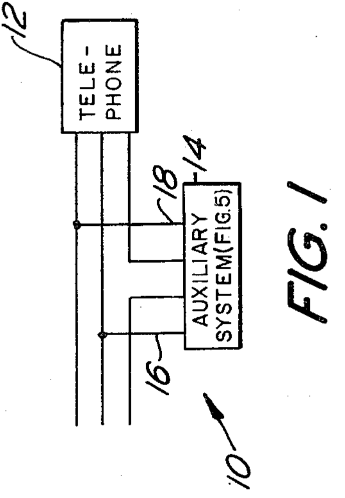
FIG. 1 is a general diagramatic view of a system embodying the present invention.

Referring now in greater detail to the figures of the drawings wherein similar reference characters refer to similar parts, there is shown in FIG. 1 a general system, designated 10, which comprises the standard red, green and yellow 'phone lines leading to the standard telephone 12. The red and green lines complete the audio circuit while the yellow line constitutes the ringing circuit. An auxiliary system embodying the present invention is designated 14 and is connected by lines 16 and 18 respectively to the green and red lines, whereby the audio circuit (red/green) wires are left connected to the 'phone, but the yellow line (ringer circuit) is cut and connected to the auxiliary system, as shown in FIG. 1. It is, of course, to be understood that the wire colors are arbitrary. These colors are here used merely because they are generally used in the Bell Telephone systems.

Figure 2:
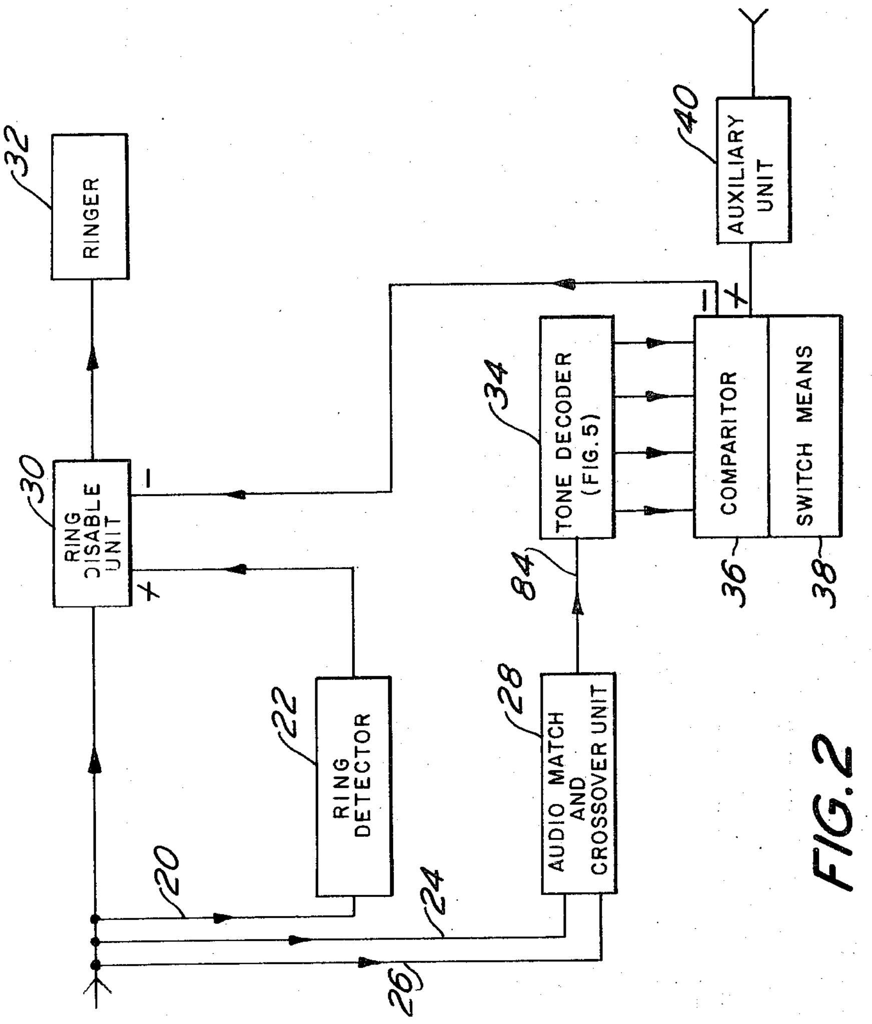
FIG. 2 is a more detailed schematic view of the auxiliary system used in the general system of FIG. 1.

As illustrated in FIG. 2, when a person calls, and the auxiliary system is operative, the ringing pulse (90V, 20 cps) is the standard used in the Bell Telephone System, although any other may be used if desired) is applied through the yellow line 20 to a ring detector 22 while the audio pulses are applied through the red line 24 and green line 26 to an audio match and crossover unit 28. The ringer signal passes from detector 22 through the yellow line to a ring disable unit 30 from which a yellow line leads to the 'phone ringer 32. The audio signals pass through the unit 28 to a tone decoder 34 which convert the tones to digits and passes the digit pulses to a comparitor system 36 controlled by switch means 38. The ring disable unit 30 initially prevents the 'phone ringer from ringing while actuating a simulator ringer. However, when the correct digital code is sensed by the comparitor system, it passes a signal to the ring disable unit 30 whereby the simulator ringer is inactivated while the actual 'phone ringer is activated. The comparitor system can also be optionally connected to auxiliary functions such as lamps, ovens, radios, alarm systems, and the like to actuate these auxiliary functions indicated generally at 40.

Figure 3:
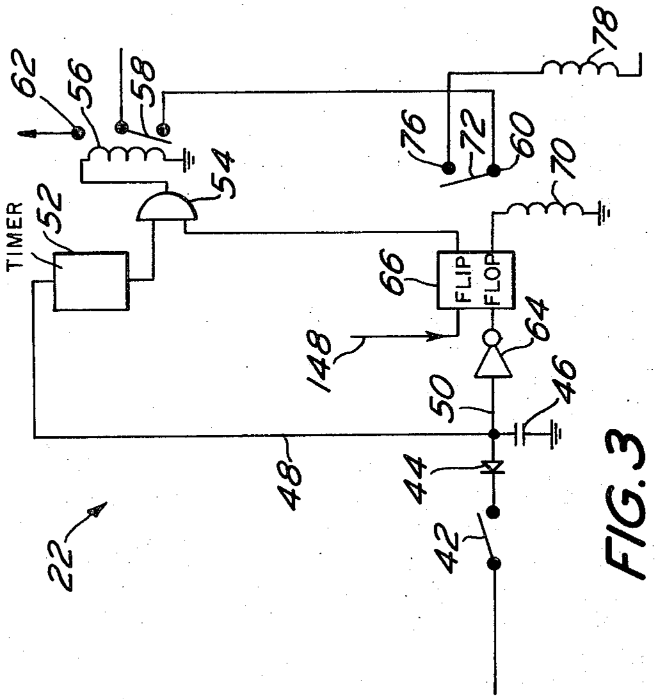
FIG. 3 is a schematic view of the ring detector and ring disable circuits of the auxiliary system.

As illustrated in FIG. 3, the ring detector 22 comprises an "off-on" switch 42 which is manually actuatable to activate or deactivate the auxiliary 'phone ringer system. It is interposed in the yellow line and is in circuit with a rectifier 44 which rectifies the incoming ringer pulse. A filter capacitor is provided at 46. The rectified signal passes in two directions, one direction through line 48 and the other through line 50.

The pulse passing through line 48 triggers a variable 3 to 7 second timer 52 that passes a pulse to an AND gate 54 which, when a comparitor output is present, has been set as hereinafter described. The AND gate 54 fires to activate a relay 56 which causes a switch 58 that is normally closed against a contact 60 to move out of engagement with contact 60 and into engagement with a contact 62. The contact 62 is in circuit with the ringer in the 'phone and, when the switch engages contact 62 it closes the circuit to the 'phone ringer causing it to ring.

The pulse passing through line 50 actuates an inverter 64 and the signal therefrom passes to a flip-flop 66 which sets the AND gate 54. The pulse from the flip-flop 66 also activates a relay 70 which causes a switch 72, normally out of engagement with a contact 76, to engage with the contact 76. This causes a false or auxiliary ringer 78 to ring. It, thereby, appears to the caller that the telephone is ringing and is not being answered, whereas, actually, the party receiving the call does not hear the ringing.

In order to complete the call so as to actuate the ringer in the 'phone itself, by setting the AND gate 54, it is necessary for the caller to touch-tone a code in the form of a series of successive digits (although even one digit may be used if so desired). The tones corresponding to these digits pass through lines 24 and 26 (note FIG. 2) to the audio match and crossover unit 28. The unit 28 (shown in detail in FIG. 4) comprises a pair of transformer coils 80 and 82 where the impedences are matched with the standard 600 ohm telephone line. The resulting pulse is then passed through line 84 into the tone decoder unit 34.

The tone decoder system (illustrated schematically in FIG. 5) comprises a series of standard SN 567 PLL phase-locked loops, designated respectively 86, 88, 90, 92, 94, 96 and 98, which correspond to the low and high tone buttons on a standard touch-tone pad 100.

It is to be noted that although a touch-tone pad is here illustrated as being the actuating means, any other pulse actuating means may be substituted, such as a dial system, etc. The loops 86 to 98 are in circuit with four banks of AND gates, designated respectively 102, 104, 106, 108, 110, 112, 114, 116, 118, 120, 122 and 124, there being three AND gates in each bank. Each bank of AND gates operates in the same manner as the others.

When a digit, as for example, digit "3" is pressed on the touch-tone pad 100, it simultaneously actuates loops 86 and 98. This causes AND gate 106 to fire sending a pulse to a flip-flop 128, which, in turn, sends a pulse through line 130 to set an AND gate 132 and also through line 134 to set the first gate on an AND gate 136. When digit "4" is pressed, it simultaneously actuates loops 88 and 94 causing AND gate 108 to fire, sending a pulse to AND gate 132 and causing it to fire. This actuates a flip-flop 138 causing it to set the second gate on AND gate 136 and to set an AND gate 140 through line 142.

When digit "5" is pressed, it simultaneously actuates the loop 88 and the loop 96. This causes AND gate 110 to fire causing AND gate 140 to fire, sending a pulse to a flip-flop 144. The resulting pulse causes AND gate 136 to fire. The resulting pulse causes a flip-flop 146 to send an enabling signal through line 148 (note FIG. 3) which resets flip-flop 66. This causes AND gate 54 to set and de-energize relay 70, whereupon switch 72 moves away from contact 76 and into engagement with contact 74. This de-energizes ringer 78. When the gate 54 is set and the coil 56 is energized, it moves the contact 58 away from contact 60 and against contact 62, which rings the 'phone.

Figures 4, 5:
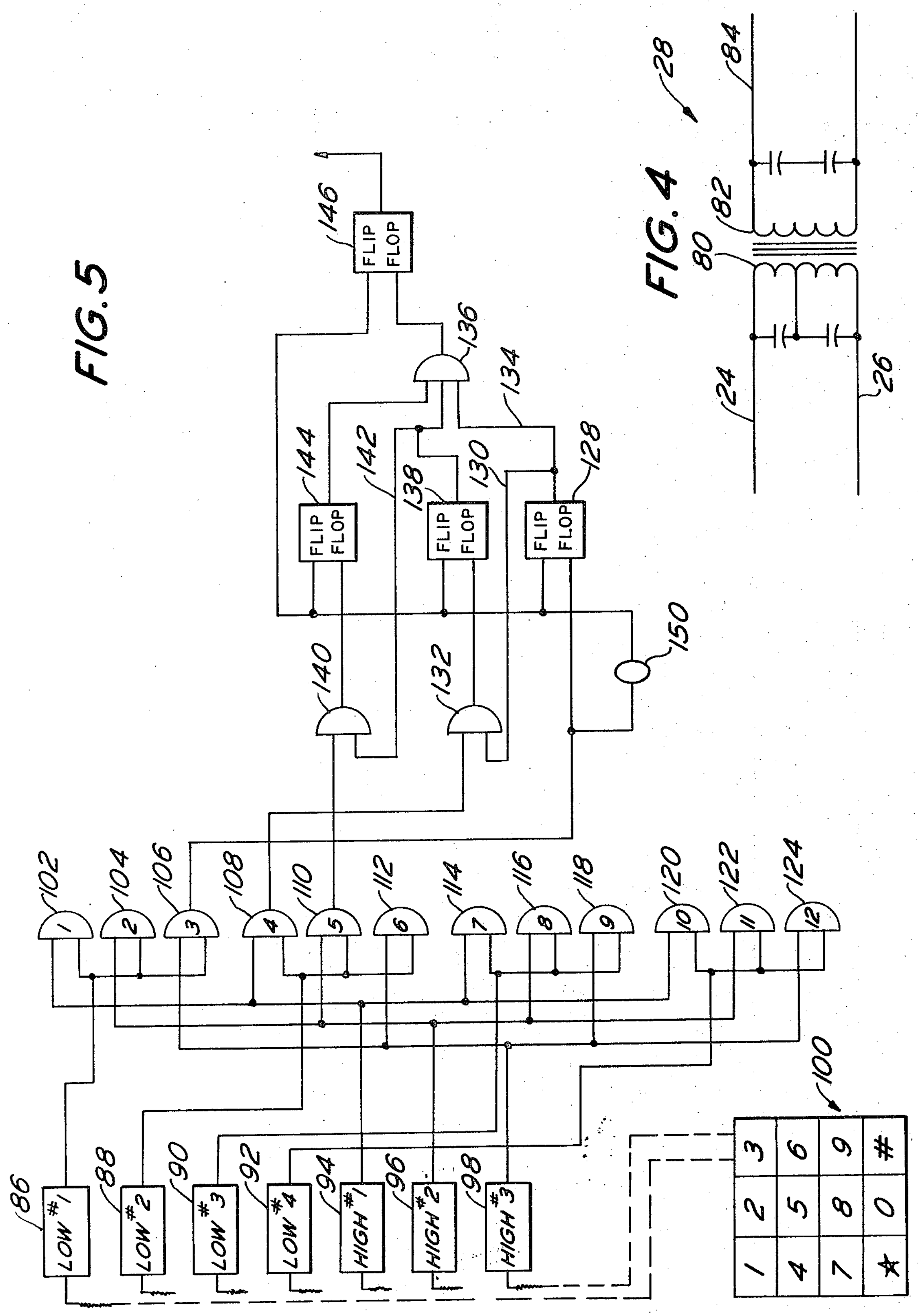
FIG. 4 is a schematic view of the audio match circuit of the auxiliary system.
FIG. 5 is a schematic view of the tone decoder, a portion of the comparitor and switching circuits as well as of the touch tone board for operation of such circuits.

A one-shot monostable multivibrator 3-second timer is preferably provided at 150 (note FIG. 5). If the correct tone code does not appear after an interval of 3 seconds, the timer 150 shuts off the 'phone ringer, the various flip-flops (128, 138, 144) thereupon being automatically reset to a new call. Of course, the timed interval may be varied to an interval other than 3 seconds if so desired.

It is to be understood that although this invention has been described in conjunction with a "ringer" device, it can equally as well be used with any other signal device such as buzzers, whistles, chimes, etc.

The comparitor circuit may, optionally, be connected through contact 76 to one or more relays preferably of the solid-state type, in the associated network indicated generally at 40 instead of to the ringer 78. In this manner, the comparitor network may be selectively programmed to be actuated by a designated code or series of codes to selectively actuate corresponding switches in the auxiliary network 40, to perform such functions as turning on lamps, ovens, radios, alarm systems, and the like by merely touch-toning the correct codes on the touch-tone board 66.

The invention claimed is:

1. In a telephone system comprising a sender and a receiver, there being audio and ringer circuits between said sender and said receiver, said receiver having a ringer therein, an auxiliary ringer network comprising:

ring detector means connected to said ringer circuit for detecting the presence of incoming ringing signals and producing a ring disable signal when said ringing signals are detected;

an auxiliary ringer;

ring disable means responsive to said ring disable signal for normally connecting said ringer circuit to said auxiliary ringer and actuatable upon receipt of an actuating signal to connect said ringer circuit to the ringer of said receiver;

ring activator means connected to said audio circuits for generating an actuating signal when a predetermined number and sequence of pulses are received from said sender; and means for applying the actuating signal from said ring activator means to said ring disable means.

2. The system of claim 1 wherein said ring activator means comprises a tone-decoder and comparitor network.

3. The system of claim 2 wherein said ring activator means includes means for actuating other auxiliary equipment upon receiving a predetermined number and sequence of pulses from said sender.

4. The system of claim 2 wherein the tone-decoder comprises a plurality of phase-locked loops, said loops being connected to decoding logic means for generating an actuating signal.

5. The system of claim 1 wherein said ring detector means comprises a rectifier in circuit with a transistor which is in circuit with a flip-flop, said rectifier being constructed and arranged to rectify an incoming ringer signal from the sender to trigger the transistor which thereupon moves the flip-flop to apply a disabling signal to a switch in the ring disable means, said switch being in circuit with both the receiver ringer and the auxiliary ringer, said switch being alternately movable from a normal position opening the circuit to the receiver ringer and closing the circuit to the auxiliary ringer to a second position opening the circuit to the auxiliary ringer and closing the circuit to the receiver ringer.

* * * * *